Figure 1:
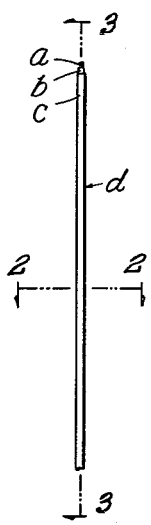

Nov. 20, 1962     KIYOSHI ANDO     3,064,414

METHOD OF PRODUCING WIRE CORD FOR HEAVY-DUTY RUBBER PRODUCTS

Filed March 14, 1960

INVENTOR.
Kiyoshi Ando
BY

United States Patent Office 3,064,414
Patented Nov. 20, 1962

3,064,414
METHOD OF PRODUCING WIRECORD FOR HEAVY-DUTY RUBBER PRODUCTS
Kiyoshi Ando, Yokosuka-shi, Kanagawa-ken, Japan, assignor to Akira Usui, Shizuoka-ken, Japan
Filed Mar. 14, 1960, Ser. No. 14,844
3 Claims. (Cl. 57—162)

This invention relates to a method of producing a metal wire-incorporated cord for use in heavy-duty rubber products.

Figure 2:
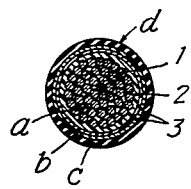
Figure 5:
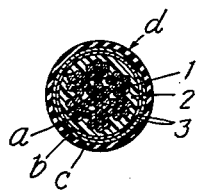
Figure 3:
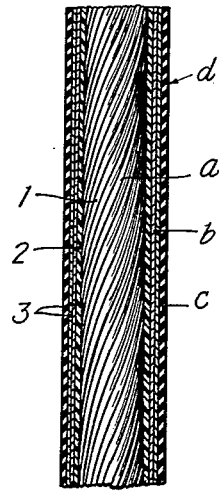
Figure 4:
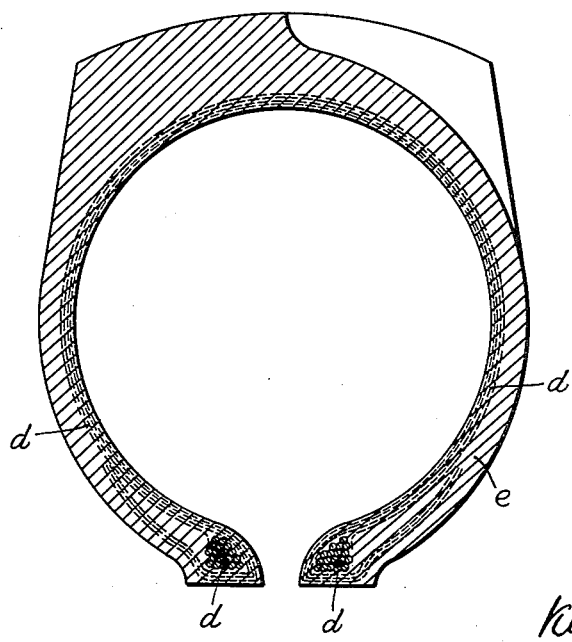

In the drawings wherein an embodiment of this invention is shown:

FIG. 1 is a side view thereof;

FIGS. 2 and 3 are enlarged sectional views taken along the lines 2—2 and 3—3, respectively, of FIG. 1;

FIG. 4 is a sectional view showing the present metal wire-incorporated cord used in an automobile tire; and FIG. 5 is an enlarged sectional view showing another modification of the invention.

Description will now be made with reference to an embodiment of this invention as shown in the drawings.

Several or dozens of steel wires or other tough metal wires 1, 1 . . . having a diameter of about 0.05–0.10 mm. are twisted together or a number of intertwisted strands of such wires are further twisted together to form a stell wire cord or metal wire cord $a$. The said cord $a$ is immersed in or drawn through a solution of synthetic resin (having a hardness between steel and rubber) such as a solution of nylon in methanol, solutions of vinyl chloride, polyethylene, and the like, after which it is dried and a synthetic resin layer 2 is formed in the gaps between the wires and around them by using an extruder.

By means of a cop-winding machine a cop layer $b$ is formed on the layer 2 by winding twisted yarns 3, 3 of cotton, nylon, silk, rayon, and the like doubly around said layer $b$ in opposite direction to each other. Cotton yarns and the like which readily adhere to rubber may be adhered directly to a rubber layer of a rubber product. However, in case of yarns which are difficult to adhere directly to rubber, they are impregnated and coated with natural or synthetic rubber admixed with an adhesive assistant, such as 5–6% formalin compound, to form a natural or synthetic rubber covering $c$.

The resulting product $d$ is used as cores of rubber products which are subjected to force during use such as automobile tires, bicycle tires, industrial belts, and the like, and it is used by being incorporated in a rubber layer $e$ of a rubber product as shown in FIG. 4.

In general, there is a marked difference between the hardness of a rubber layer and that of metal wires, and consequently when rubber layer and metal wires are adhered together directly, shocks subjected to the rubber product from the exterior quickly pass to the hard metal wires and break them or produce a severe frictional force between these metal wires and thereby impair them.

According to the present invention, the hardness of the synthetic resin impregnated in and coated on the steel wire cord lies midway between the hardness of steel or other metal wires and that of rubber, and therefore shocks or jars subjected to the rubber product pass to the steel or other metal wires after being buffered. As the mechanical forces of shocks or jars are absorbed or lessened, the wires are prevented from breaking or being impaired, and at the same time the pesence of the synthetic film arrests any formation of rust. With the provision of the layer $b$ of twisted yarns 3, 3 of cotton, rayon, nylon, silk or the like around the synthetic resin coating, the product may be adhered directly to rubber when said layer $b$ is of cotton yarn and may be adhered by means of providing an intermediate rubber layer when said layer $b$ consists of nylon, silk, rayon or the like which do not readily adhere directly to rubber. Consequently, the cords will not excoriate from the rubber by shocks or jars from the exterior or by heat, and further the metal wires serve to diffuse heat and thereby prevent any breakage caused by overheating at this part.

As described above, this invention prevents breakages caused by shocks, excoriation due to jars and excoriations due to difference in thermal expansion coefficient which occur because of the marked difference in hardness between heretofore steel wires and rubber. Adhesion between the cord and rubber is maintained by means of fibers as hitherto, and furthermore by means of the synthetic resin any impairment caused by the wires rubbing against each other is avoided and the wires are prevented from rusting.

What I claim is:

1. The method of producing cores suitable for use in heavy duty rubber products, comprising the steps of; inter-twisting a plurality of tough metal wire strands to form a metal wire cord; immersing said cord in a synthetic resin solution selected from the group consisting of nylon in methanol, vinyl chloride and polyethylene; drying the cord and resin composite; forming a synthetic resin layer in the gaps between the wire strands and around them using an extruder; cop-winding cop layers of fiber yarn in phase opposition; and thereby producing a core useful in rubber products subjected to force during use such as automobile tires.

2. A method as claimed in claim 1, said metal being steel, said wire strands having a diameter of about 0.05 to about 0.10 mm.

3. A method as claimed in claim 1, including the additional step of impregnating said fiber yarn with rubber admixed with an adhesive assistant.

References Cited in the file of this patent

UNITED STATES PATENTS

| | | |
|---|---|---|
| 974,855 | Bousquet | Nov. 8, 1910 |
| 2,067,405 | Mayne | Jan. 17, 1937 |
| 2,257,648 | Pierce | Sept. 30, 1941 |
| 2,335,644 | Camp | Nov. 30, 1943 |
| 2,353,432 | Arrington | July 11, 1944 |
| 2,372,142 | Warren | Mar. 20, 1945 |
| 2,382,081 | Luaces et al. | Aug. 14, 1945 |
| 2,483,716 | White | Oct. 4, 1949 |
| 2,500,523 | Crosby et al. | Mar. 14, 1950 |
| 2,934,126 | Wilson | Apr. 26, 1960 |

FOREIGN PATENTS

| | | |
|---|---|---|
| 1,115,275 | France | Dec. 26, 1955 |